United States Patent
Charbonnel et al.

(10) Patent No.: US 10,947,919 B1
(45) Date of Patent: Mar. 16, 2021

(54) FUEL INJECTION CONTROL USING A NEURAL NETWORK

(71) Applicant: Caterpillar Inc., Peoria, IL (US)

(72) Inventors: Sylvain Charbonnel, Peoria, IL (US); Greg Armstrong, Edwards, IL (US); Anand Krishnamurthygopalan, Edwards, IL (US); James Ulstad, Edwards, IL (US); Kranti Nellutla, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 16/551,317

(22) Filed: Aug. 26, 2019

(51) Int. Cl.
*F02D 41/14* (2006.01)
*F02D 41/40* (2006.01)
*F02D 41/26* (2006.01)
*F02D 41/00* (2006.01)

(52) U.S. Cl.
CPC ..... *F02D 41/1405* (2013.01); *F02D 41/0052* (2013.01); *F02D 41/0085* (2013.01); *F02D 41/26* (2013.01); *F02D 41/401* (2013.01)

(58) Field of Classification Search
CPC ............. F02D 41/0052; F02D 41/0085; F02D 41/1405; F02D 41/401
USPC ........................... 123/674; 701/104, 106, 674
See application file for complete search history.

(56) References Cited

U.S. PATENT DOCUMENTS

| | | | |
|---|---|---|---|
| 5,806,013 A | 9/1998 | Paielli | |
| 6,098,012 A * | 8/2000 | Stander | F02D 37/02 123/406.47 |
| 6,223,121 B1 | 4/2001 | Ishida | |
| 6,289,275 B1 | 9/2001 | Stander et al. | |
| 6,687,597 B2 * | 2/2004 | Sulatisky | F02D 19/0623 701/104 |
| 6,705,294 B2 * | 3/2004 | Shinogle | F02D 41/2467 123/486 |
| 6,962,140 B1 * | 11/2005 | Nakai | F02D 41/2467 123/436 |
| 7,062,333 B2 | 6/2006 | Mizutani | |
| 7,895,990 B2 * | 3/2011 | Ishizuka | F02D 41/40 123/478 |
| 8,676,476 B2 * | 3/2014 | Malikopoulos | F02D 41/1406 701/106 |
| 9,127,612 B2 * | 9/2015 | Nakata | F02D 41/2464 |
| 10,196,997 B2 | 2/2019 | Merlino et al. | |
| 2003/0187567 A1 | 10/2003 | Sulatisky | |
| 2007/0233326 A1 | 10/2007 | Jayachandran | |
| 2018/0179975 A1 | 6/2018 | Merlino | |
| 2020/0049098 A1 | 2/2020 | Kapp | |

FOREIGN PATENT DOCUMENTS

| | | |
|---|---|---|
| DE | 10148973 | 4/2003 |
| JP | 10176578 | 6/1998 |

\* cited by examiner

*Primary Examiner* — Erick R Solis
(74) *Attorney, Agent, or Firm* — Harrity & Harrity LLP

(57) ABSTRACT

A fuel injector controller is disclosed. The fuel injector controller may determine respective values of a set of parameters of the engine; process, using a neural network, the respective values to determine a target fuel output of a fuel injector, wherein the neural network is configured to determine the target fuel output based on the set of parameters being an input layer of the neural network; determine, based on an output of the neural network, the target fuel output; and provide the determined target fuel output to the fuel injector to permit the fuel injector to inject fuel according to the target fuel output.

20 Claims, 4 Drawing Sheets

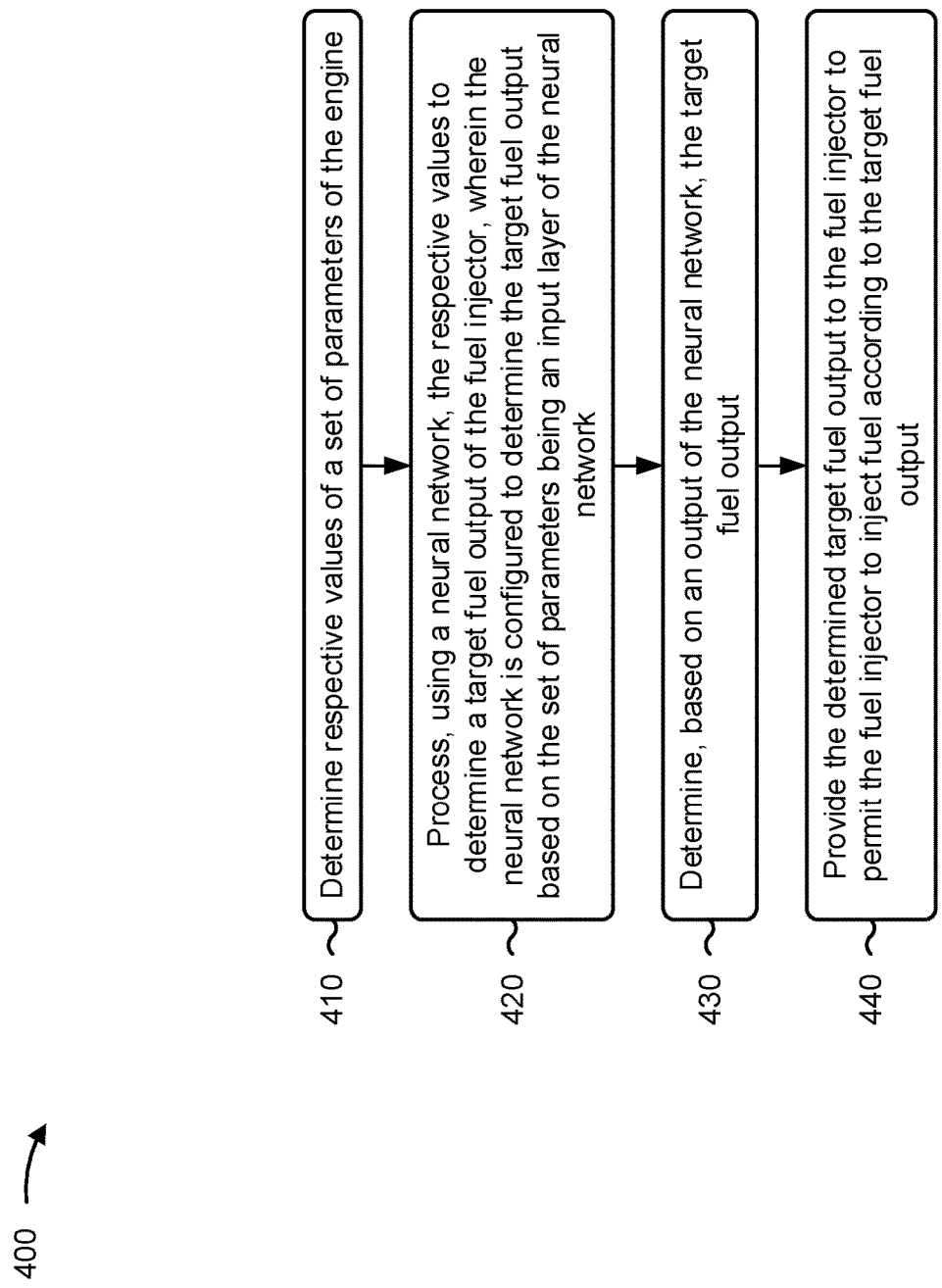

FUEL INJECTION CONTROL USING A NEURAL NETWORK

TECHNICAL FIELD

The present disclosure relates generally to fuel injectors and, for example, to control of fuel injectors.

BACKGROUND

A fuel injector is configured to inject fuel into a cylinder of an engine. A quantity (or amount) of fuel that is injected into the engine may be controlled using an engine control module (ECM) of the engine. The ECM may determine a desired quantity of fuel (a desired fuel output) based on operating conditions of the engine, an operator input, and/or the like. However, over time and/or at various times, characteristics of a fuel injector and/or an engine may change (e.g., depending on usage, wear and tear, mechanical failures, calibration settings, and/or the like), thus affecting an actual fuel output from a fuel injector, while parameters used to determine a desired fuel output may relatively be maintained. Accordingly, previous techniques for controlling a fuel output may not accurately cause a fuel injector to inject a quantity of fuel corresponding to a desired fuel output.

One attempt at engine control is disclosed in U.S. Pat. No. 10,196,997, which issued to Merlino et al. on Feb. 5, 2019 ("the '997 patent"). In particular, the '997 patent discloses an engine control unit that includes a neural network controller installed with a neural network to generate a fuel setpoint signal based on the torque request and to define a combustion model of the engine. The neural network generates a start of injection (SOI) signal indicating a start time at which to cause a fuel injector to inject the fuel to generate a drive torque indicated by a torque request.

While the engine control unit of the '997 patent may use a neural network to generate an SOI signal for a fuel injector, the '997 patent does not address a potential inaccuracy between a desired fuel output and an actual fuel output.

A fuel injector controller of the present disclosure solves one or more of the problems set forth above and/or other problems in the art.

SUMMARY

According to some implementations, a method may include provisioning, based on a set of parameters, a neural network to provide a target fuel output for a fuel injector of an engine under operation, wherein the target fuel output is to be within a threshold range of a desired fuel output of the fuel injector; determining the desired fuel output of the fuel injector; receiving respective values of the set of parameters, wherein the set of parameters are associated with a set of components of the engine and the desired fuel output; determining, based on the respective values and the neural network, the target fuel output; and configuring the fuel injector to inject a fuel according to the target fuel output.

According to some implementations, an engine control module may include one or more memories, and one or more processors communicatively coupled to the one or more memories, configured to: configure, based on a set of parameters, a neural network to provide a target fuel output for a fuel injector of an engine; determine respective values of the set of parameters of the engine while the engine is under operation, wherein the set of parameters include: a desired fuel output, an instantaneous engine speed associated with the engine, a pressure at a start of a fuel injection of the fuel injector, and timing associated with the fuel injection of the fuel injector; process, using the neural network, the respective values to determine the target fuel output; and cause the fuel injector to inject fuel according to the determined target fuel output.

According to some implementations, a system may include an engine; a fuel injector to inject fuel into one or more cylinders of the engine; and an engine control module configured to, while the engine is under operation: determine respective values of a set of parameters of the engine; process, using a neural network, the respective values to determine a target fuel output of the fuel injector, wherein the neural network is configured to determine the target fuel output based on the set of parameters being an input layer of the neural network; determine, based on an output of the neural network, the target fuel output; and provide the determined target fuel output to the fuel injector to permit the fuel injector to inject fuel according to the target fuel output.

BRIEF DESCRIPTION OF THE DRAWINGS

FIG. 4 is a flowchart of an example process associated with fuel injection control using a neural network.

DETAILED DESCRIPTION

This disclosure relates to fuel injection control by a fuel injector controller that uses a neural network (referred to herein as a "fuel injection neural network"). The fuel injection neural network has universal applicability to any machine utilizing such a fuel injector controller and/or an engine control module (ECM) to control fuel injectors of an engine. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment.

Figure 1:
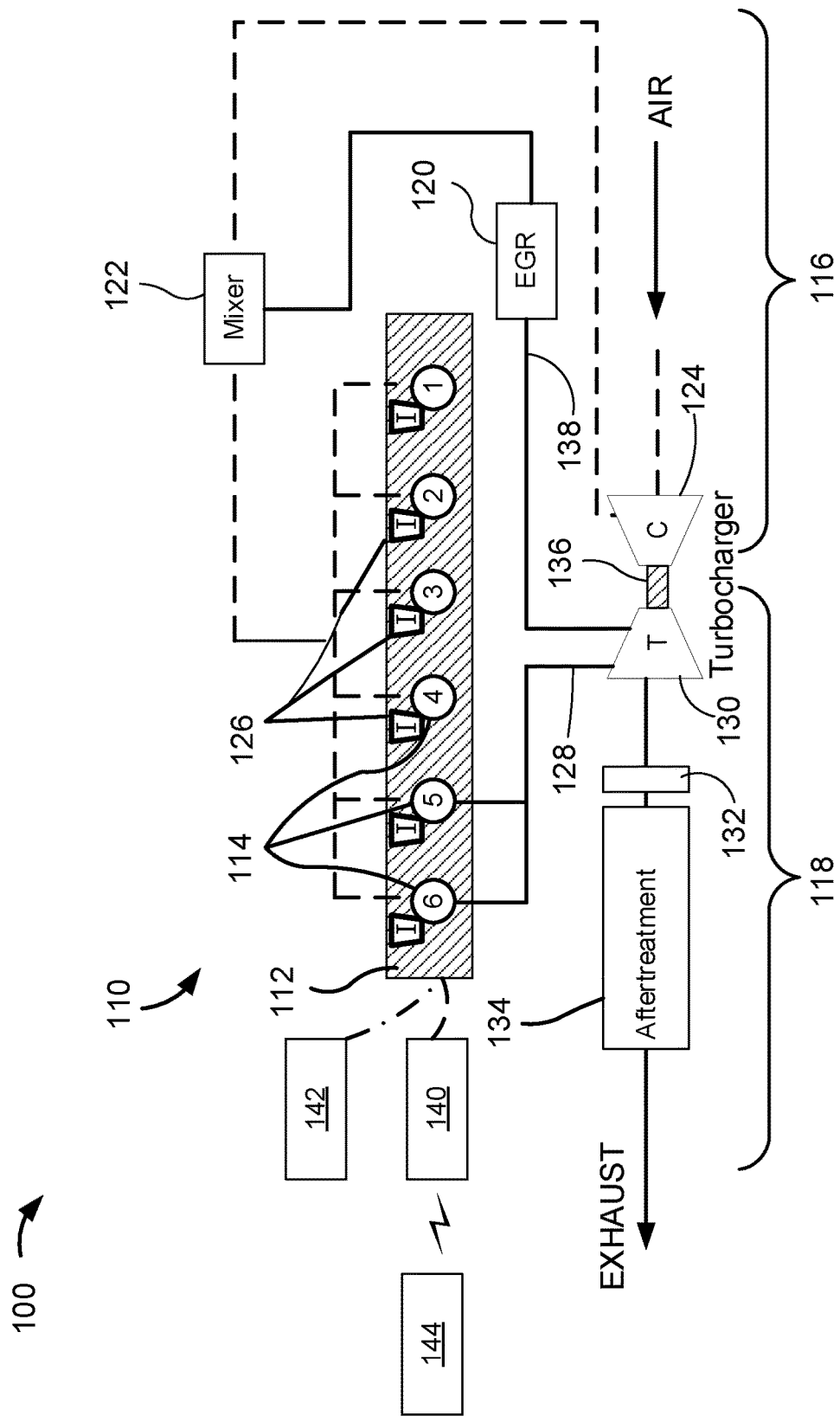
FIG. 1 is a diagram of an example power system described herein.

FIG. 1 is a diagram of an example power system 100 described herein. As shown, power system 100 includes an engine 110, which may be described herein as a compression ignition, internal combustion engine. However, engine 110 may include any other type of internal combustion engine, such as, for example, a spark, laser, a plasma ignition engine, and/or the like. Engine 110 may be fueled by such fuels as distillate diesel fuel, biodiesel, dimethyl ether, gaseous fuels, such as hydrogen, natural gas, propane, alcohol, ethanol, and/or any combination thereof.

Engine 110, of FIG. 1, includes an engine block 112 with a plurality of cylinders 114 (engine block 112 of FIG. 1 is shown with six cylinders 114). A piston assembly may be included within each of cylinders 114 to form a combustion chamber within each cylinder 114. Engine 110 may include any number of combustion chambers, and the combustion chambers may be disposed in an in-line configuration, a "V" configuration, or in any other suitable configuration. Furthermore, engine 110 may consume one or more consumable resources (e.g., a fuel (e.g., gasoline, diesel fuel, and/or the like), a diesel exhaust fluid (DEF), one or more coolants, one or more lubricants (e.g., an oil, a grease, and/or the like), and/or the like) during operation (e.g., due to combustion in the engine block).

Engine 110 may include multiple systems. For example, as shown in the example of FIG. 1, engine 110 may include an air intake or air induction system 116, an exhaust system 118, and an exhaust gas recirculation (EGR) system 120. Air induction system 116 may be configured to direct air, or an air and fuel mixture (e.g., of air and another gas, such as exhaust gas) into engine 110 for subsequent combustion. Exhaust system 118 may exhaust or release byproducts of the combustion to an atmosphere external to engine 110. A recirculation loop of the EGR system 120 may be configured to direct a portion of the exhaust gases from exhaust system 118 back into air induction system 116 for subsequent combustion.

Air induction system 116 may include multiple components that cooperate to condition and introduce compressed air into cylinders 114. For example, air induction system 116 may include a mixer 122, or intake manifold, located downstream of one or more compressors 124. Air induction system 116 feeds air to fuel injectors 126 that are associated with respective ones of cylinders 114. In some implementations, air induction system 116 may include a throttle valve (to supply fuel to fuel injectors 126), an air cooler, a filtering component, a compressor bypass component, and/or the like. Fuel injectors 126 may inject fuel into cylinders 114 based on one or more control signals. The one or more control signals may be configured to cause fuel injectors 126 to inject a desired quantity (or volume) of fuel, inject fuel at a particular time, and/or the like. As described herein, fuel injectors 126 may be controlled to inject fuel into cylinders 114 based on one or more parameters of engine 110. For example, fuel injectors 126 may be controlled to inject fuel using a neural network that receives values for the one or more parameters and provides a target fuel output to fuel injectors 126. As described herein, the one or more parameters may be controllable parameters associated with air induction system 116. For example, the one or more parameters may correspond to a pressure level of air when the air enters a combustion chamber (e.g., a setting of compressor 124), timing of the air as the air enters the combustion chamber (e.g., opening timing and/or closing timing of valve actuators of fuel injectors of cylinders 114), an optimized intake throttle valve position (e.g., a position of an intake throttle valve of air induction system 116), and/or the like.

Exhaust system 118 may include multiple components that cooperate to condition and direct exhaust from cylinders 114 to the atmosphere. For example, exhaust system 118 may include an exhaust passageway 128, one or more turbines 130 driven by exhaust flowing through exhaust passageway 128, a particulate collection device 132, such as a diesel particulate filter (DPF) located downstream of turbine 130, and an exhaust aftertreatment device 134 (e.g., an aftertreatment selective catalytic reduction (SCR)) fluidly connected downstream of particulate collection device 132. In some implementations, exhaust system 118 may include one or more bypass components, an exhaust compression or restriction brake, an attenuation device, additional exhaust treatment devices, and/or the like.

Turbine 130 may be located to receive exhaust leaving engine 110 and may be connected to the one or more compressors 124 of air induction system 116 by way of a common shaft 136 to form a turbocharger. As exhaust gases exiting engine 110 flow through turbine 130 and expand against vanes thereof, turbine 130 may rotate and drive the one or more compressors 124 to pressurize inlet air.

In some implementations, particulate collection device 132 may be a DPF located downstream of turbine 130 to remove particulate matter from the exhaust flow of engine 110. In some implementations, particulate collection device 132 may include an electrically conductive or non-conductive coarse mesh metal or porous ceramic honeycomb medium. As the exhaust flows through the medium, particulates may be blocked by and trapped in the medium. Over time, the particulates may build up within the medium and, if unaccounted for, could affect engine performance by increasing exhaust backpressure. To minimize backpressure effects on engine performance, the collected particulates may be passively and/or actively removed through a regeneration process.

Exhaust aftertreatment device 134 may receive exhaust from turbine 130 and trap or convert particular constituents in the gas stream. In one example, exhaust aftertreatment device 134 may embody an SCR device having a catalyst substrate located downstream from a reductant injector. A gaseous or liquid reductant, most commonly urea, or a water and urea mixture, may be sprayed or otherwise advanced into the exhaust upstream of catalyst substrate by a reductant injector. As the reductant is absorbed onto the surface of catalyst substrate, the reductant may react with NOx (NO and $NO_2$) in the exhaust gas to form water ($H_2O$) and elemental nitrogen ($N_2$). In some embodiments, a hydrolysis catalyst may be associated with the catalyst substrate to promote even distribution and conversion of urea to ammonia ($NH_3$).

In some implementations, fuel injectors 126 may be controlled, as described herein, to inject fuel according to one or more parameters associated with exhaust system 118. For example, the one or more parameters may correspond to a position of an exhaust backpressure valve of exhaust system 118, a mass flow through particulate collection device 132 (e.g., which may be based on an active regeneration and/or passive regeneration via particulate collection device 132), a pressure of exhaust gases (e.g., which may be based on a temperature and/or a pressure in the exhaust downstream from turbine 130), and/or the like.

EGR system 120 may redirect gases from exhaust system 118 back into air induction system 116 for subsequent combustion. EGR is a process whereby exhaust gas from the engine is recirculated back into air induction system 116 for subsequent combustion. The recirculated exhaust gases may reduce the concentration of oxygen within the combustion chambers, and simultaneously lower the maximum combustion temperature therein. The reduced oxygen levels may provide fewer opportunities for chemical reaction with the nitrogen present, and the lower temperature may slow the chemical process that results in the formation of NOx. As mentioned above, a cooler may be included to cool the exhaust gases before the gases are combusted.

When utilizing EGR in a turbocharged diesel engine, as shown in FIG. 1, the exhaust gas to be recirculated may be removed upstream of the exhaust gas driven turbine 130 associated with the turbocharger. For example, in many EGR applications, the exhaust gas may be diverted from the exhaust passageway 128 and diverted via an EGR conduit 138 to air induction system 116. Likewise, the recirculated exhaust gas may be re-introduced to the air induction system 116 downstream of the compressor 124. In some implementations, EGR system 120 may be an external EGR system and/or may include various features for implementation of the methods described herein, such as a system of primary control and bypass valves to allow an engine control module (ECM) 140 to control various flows through the EGR system during selected engine operating conditions.

Fuel injectors 126 may be controlled to inject fuel, as described herein, using one or more parameters associated with EGR system 120. For example, the one or more parameters may include a mass flow of exhaust gas through EGR system 120 (e.g., which may be based on a position of an EGR bypass valve connected to EGR conduit 138).

In some instances, engine 110 may be controlled according to an optimization process that may be calibrated (e.g., configured) to be optimized according to calibration information. The calibration information may identify one or more operating characteristics associated with operating engine 110. The optimization process may iteratively be performed to determine optimized values associated with the one or more parameters of the engine to permit the operating characteristic of engine 110 to be optimized. Such operating characteristics may include an expected life span and/or usage rate associated with the engine 110, a performance characteristic associated with the engine 110, or a cost (e.g., a financial cost associated with consumable resources used to operate a power system, a time cost associated with operating the machine and/or maintaining the machine, and/or the like) associated with operating engine 110.

Engine 110 of FIG. 1 is associated with an ECM 140. ECM 140, as described herein, controls engine 110 in order to operate the engine 110 based on engine operating conditions as indicated by a sensor system 142 and/or calibration information as indicated by a calibration system 144. ECM 140 may perform various control functions and processes to control engine 110 and determine a target fuel output for fuel injectors 126 according to parameters of engine 110. ECM 140 may include any appropriate type of engine control system configured to perform engine control functions such that engine 110 may operate properly. Further, ECM 140 may also control another system of a vehicle or a machine associated with engine 110, such as a transmission system, a hydraulics system, and/or the like.

Sensor system 142 may provide measurements associated with various parameters used by ECM 140 to control engine 110 and/or to determine a target fuel output for fuel injectors 126. Sensor system 142 may include physical sensors and/or any appropriate type of control system that generates values of parameters based on a computational model and/or one or more measurements. Example sensors may include temperature sensors, speed sensors, chemical composition sensors (e.g., a NOx emission sensor), pressure sensors, and/or the like. Parameters may also include any output parameters that may be measured indirectly by sensors and/or calculated based on readings of the sensors. Measurements of the parameters, as used herein, may refer to any values relevant to the parameters and indicative of the state or condition of the engine 110. For example, measurements may include values associated with engine 110, a machine associated with engine 110, an environment of engine 110, and/or the like. Such values may correspond to speeds (e.g., an engine speed of engine 110), pressures (e.g., an injection pressure of one of the fuel injectors 126), temperatures, usage, usage rates, ambient conditions, fuel rates, and/or the like.

Sensor system 142 may be configured to coincide with ECM 140, may be configured as a separate control system, and/or may be configured as a part of other control systems. Further, ECM 140 may implement sensor system 142 by using computer software, hardware, or a combination of software and hardware. For example, ECM 140 may execute instructions to cause sensors of sensor system 142 to sense and/or generate values of parameters, based on a need to determine a target fuel output from fuel injectors 126, an optimization model, and/or the like.

Calibration system 144 may provide calibration information associated with optimizing one or more operating characteristics of engine 110. Accordingly, ECM 140 may use the calibration information to control engine 110 and/or determine optimized settings for engine 110. Calibration system 144 may include one or more calibration devices that determine and/or provide the calibration information. As used herein, the calibration information may include a user preference (e.g., received via a user input), one or more variables associated with the one or more operating characteristics, and or the like. Example calibration devices may include a user device, a user interface of the user device, a user interface tool (e.g., an external tool, an onboard diagnostic tool, and/or the like), a calibration information platform (e.g., a web-based platform that provides calibration information), and/or the like. An operating characteristic that is to be optimized may include one or more of a usage rate associated with engine 110, a performance characteristic associated with engine 110, a cost associated with operating engine 110, and/or the like.

Calibration system 144 may be configured to coincide with ECM 140, may be configured as a separate control system, and/or may be configured as a part of other control systems. Further, ECM 140 may at least partially implement calibration system 144 by using computer software, hardware, or a combination of software and hardware. For example, ECM 140 may execute instructions to cause calibration devices of calibration system 144 to obtain calibration information based on an optimization model and/or other parameters.

ECM 140 may identify, obtain, and/or determine parameters that are associated with conditions (e.g., as sensed by sensor system 142) or settings corresponding to the operations of engine 110, such as engine speed and/or a desired fuel output (e.g., corresponding to an actual fuel rate or a an actual fuel quantity that is to be injected by fuel injectors 126 into cylinders 114 of engine 110). Furthermore, as described herein, ECM 140 may identify, obtain, and/or determines parameters that are associated with fuel injectors 126, such as injection timing (e.g., a start of injection (SOI) corresponding to positions of piston assemblies of cylinders 114), fuel injection pressure (e.g., a start of injection pressure (SOIP) corresponding to a pressure associated with starts of fuel injections by fuel injectors 126). ECM 140 may use one or more other parameters to control one or more operations described herein in association with engine 110 and/or fuel injectors, such as torque delivered by the engine, exhaust pressure, number of cylinders 114 firing, oxygen/fuel molar ratio, ambient temperature, ambient pressure (e.g., barometric pressure), mass flow through particulate collection device 132, exhaust backpressure valve position, shot configuration (e.g., shot mode corresponding to a number of shots per rotation, a quantity of fuel per shot, a duration of time between shots, and/or the like), coolant temperature, total induction mass flow in multi-shot mode, dwell (e.g., length of time between shots) in multi-shot mode, and/or the like. Such parameters may be measured by sensors of sensor system 142 and/or determined by ECM 140.

As indicated above, FIG. 1 is provided as an example. Other examples may differ from what is described in connection with FIG. 1.

Figure 2:
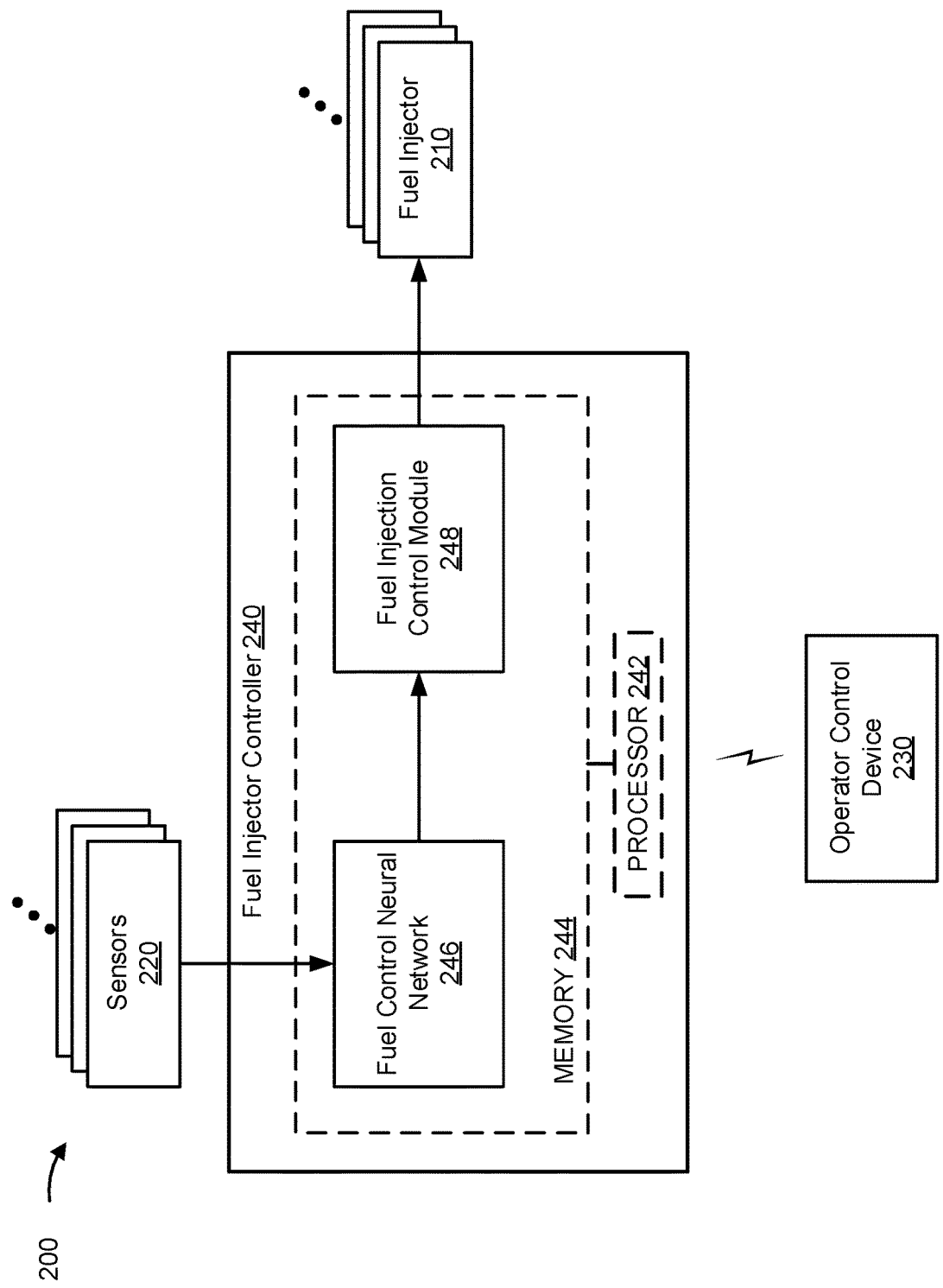
FIG. 2 is a diagram of an example fuel control system in which systems and/or methods described herein may be implemented.

FIG. 2 is a diagram of an example fuel control system 200 in which systems and/or methods described herein may be implemented. As shown in FIG. 2, fuel control system 200 may include one or more fuel injectors 210 (referred to individually as "fuel injector 210" and collectively as "fuel injectors 210" and which may correspond to fuel injectors 126 of FIG. 1), one or more sensors 220 (referred to individually as "sensor 220" and collectively as "sensors 220"), an operator control device 230, a fuel injector controller 240 (which may correspond to ECM 140 of FIG. 1). As shown in FIG. 2, fuel injector controller 240 may include a processor 242, a memory 244, a fuel control neural network 246, and a fuel injection control module 248.

Fuel injector controller 240 may be configured to control fuel injectors 210 to inject fuel to operate an engine (e.g., engine 110 of FIG. 1) according to one or more parameters and using fuel control neural network 246, as described herein. As described herein, fuel injector controller 240 may determine a target fuel output for a specific fuel injector 210 that accounts for any flaws and/or inaccuracies of the fuel injector 210 so that a quantity of fuel injected by fuel injector 210 corresponds, more accurately, to the desired fuel output of the engine. The quantity of fuel may correspond to an amount (or volume) of fuel per shot, an amount of fuel per rotation of a piston assembly of the engine, an amount of fuel per engine cycle of the engine, and/or the like. As used herein, the target fuel output for a fuel injector may be determined using a neural network while a desired fuel output is of the engine may be desired using any suitable techniques. Devices and/or components of fuel control system 200 may interconnect via wired connections, wireless connections, or a combination of wired and wireless connections.

Fuel injector 210 may include one or more devices (e.g., mechanical devices, electrical devices, electromechanical devices, hydraulic devices, and/or the like) used by fuel injector controller 240 to inject fuel into cylinders (e.g., cylinders 114) of the engine. For example, fuel injectors 210 may include one or more actuators, valves, switches, chambers, nozzles, and/or the like to inject a volume of fuel, at a particular time, into the cylinders according to a target fuel output received from fuel injector controller 240. Accordingly, fuel injector 210 may operate according to control signals received from fuel injector controller 240. Fuel injectors 210 may be associated with one or more parameters used by fuel injector controller 240 to control fuel injection as described herein. For example, a value of one or more of the parameters may correspond to a setting of fuel injector 210, a measurement associated with fuel injector 210, a usage of fuel injector 210, and/or the like. Such settings, measurements, usages, and/or the like may correspond to timing associated with fuel injector 210 injector injecting fuel (e.g., a desired timing and/or a measured/actual timing), a pressure of fuel when injected by fuel injector 210 (e.g., a desired pressure for a desired fuel output and/or a measured/actual pressure for the desired fuel output), an overall operating time of fuel injector 210, an overall age of fuel injector 210, an overall quantity of fuel injected by fuel injector 210, and/or the like.

Similarly, fuel control system 200 may include one or more control devices that may be used by fuel injector controller 240 to control one or more other operations of the engine. For example, the one or more control devices may include one or more actuators, switches, and/or the like that are capable of opening and/or closing a valve of the engine, adjusting a temperature of the engine (e.g., using a fan, a cooling system, and/or the like), adjusting a pressure of the engine (e.g., by controlling an amount of air or gas that is supplied to a component of the engine), and/or the like. Further, such control devices may be associated with one or more parameters used by fuel injector controller 240 to control fuel injection as described herein.

Sensors 220 may include any type of sensor configured to measure operating conditions of the engine. Sensors 220 may be sensors of sensor system 142 of FIG. 1, as described herein. For example, sensors 220 may include temperature sensors (e.g., to measure temperature of air, exhaust, a component, coolant, and/or the like), position sensors (e.g., to measure a position of a valve, an actuator, an engine, and/or the like, such as a position of a crank of a piston assembly when fuel is injected corresponding to an SOI of fuel injector 210), speed sensors (e.g., to measure an engine speed, a machine speed, and/or the like), pressure sensors (e.g., to measure a fuel injection pressure, such as SOIP of fuel injector 210), emissions sensors (e.g., to measure emission levels of the engine), and/or the like.

Sensor 220 may be associated with one or more of the parameters (e.g., operating parameters) that may be used by fuel injector controller 240 to control fuel injection, as described herein. For example, sensor 220 may indicate a value of an operating parameter of the engine, such as a measured speed of the engine by a speed sensor, a measured SOIP by a pressure sensor, a measured SOI by a position sensor, a measured position of an actuator by a position sensor, a measured temperature by a temperature sensor, measured emissions by an emissions sensor, and/or the like.

Operator control device 230 may include any type of device, system, and/or platform configured to permit an operator to control an operation and/or performance of the engine via fuel injector controller 240. For example, operator control device 230 may include a control console of an operator station (e.g., an operator station of a machine associated with the engine), a user device, a user interface of a user device, a user interface tool configured to communicate with fuel injector controller 240, and/or the like. In some implementations, operator control device 230 may be configured to enable calibration information for the engine to be provided to fuel injector controller 240. For example, operator control device 230 may be and/or may include one or more calibration devices of calibration system 144 of FIG. 1, as described herein. Accordingly, an operator may control and/or calibrate the engine via operator control device 230.

Fuel injector controller 240 may correspond to and/or be a module of ECM 140 of FIG. 1. Processor 242 is implemented in hardware, firmware, and/or a combination of hardware and software. Processor 242 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 242 includes one or more processors capable of being programmed to perform a function. Memory 244 includes a random-access memory (RAM), a read only memory (ROM), and/or another type of dynamic or static storage device (e.g., a flash memory, a magnetic memory, and/or an optical memory) that stores instructions and/or corresponding data for use by processor 242 (e.g., computer software instructions associated with fuel control neural network 246, fuel injection control module 248, and/or the like).

Fuel injector controller 240 may use fuel control neural network 246 to determine a target fuel output that is to be provided to one or more of the fuel injectors 210 according to a set of parameters, as described herein. Fuel control neural network 246 may be configured to provide a target fuel output that is within a threshold range (e.g., within 2%, 5%, within 10%, and/or the like) of a desired fuel output for the engine. The desired fuel output for the engine corresponds to a desired quantity of fuel that is to be supplied and/or delivered to the engine by the one or more fuel injectors 210. The desired fuel output may be determined based on any suitable technique to determine a quantity of fuel that is to be supplied to the engine to permit the engine to operate as designed. For example, the desired fuel output may be determined based on an instantaneous engine speed (e.g., a measured speed at which the engine is operating when fuel control neural network 246 is to determine a target fuel output for fuel injector 210) of the engine and a determined desired engine speed of the engine. More specifically, the desired engine output may correspond to a quantity of fuel that is to be delivered by fuel injectors 210 without considering any the status of the fuel injectors 210. ECM 140 may be configured to determine the desired fuel output (the quantity of fuel that is to be delivered by fuel injectors 210) based on a mapping, a calculation, and/or the like that uses an instantaneous engine speed of the engine and a determined desired engine speed for the engine. The desired engine speed of the engine may be determined (e.g., by ECM 140) based on information from operator control device 230 (e.g., a user input indicating a desired power output of the engine, a load of the engine and/or a machine of the engine, a transmission setting, and/or the like) and/or sensors 220 (e.g., a load sensor capable of detecting a load of the engine and/or the like).

Due to fuel injectors 210 being unable to provide fuel according to the desired output over time (e.g., due to wear and tear of fuel injectors 210, wear and tear of the engine, changes in calibration settings of the engine, and/or the like), the actual quantity of fuel delivered by fuel injectors 210 may not correspond to the desired fuel output. In other words, the actual quantity of fuel injected into the cylinders of the engine by fuel injectors 210 may not be the same as what is need for the engine to operate as desired. Accordingly, as described herein, fuel injector controller 240 may use fuel control neural network 246 to determine a target fuel output specific to fuel injectors 210 that enables a quantity of fuel that corresponds to the desired fuel output of the engine to more accurately be injected. To provide a target fuel output to fuel injectors 210 that is within the threshold range of the desired fuel output, the fuel control neural network 246 may be configured by being trained using one or more training values for one or more parameters of the engine and/or parameters specific to fuel injectors 210 that are to be used to determine the target fuel output. The training values for the set of parameters may correspond to various values for a set of parameters that are to be processed by the fuel control neural network 246 to determine a target fuel output for fuel injectors 210 so as to accurately provide the desired fuel output to the engine. The training values for the set of parameters may be values based on a plurality of different calibrations for optimizing engines under operation.

Fuel control neural network 246 may be trained using a supervised training procedure that includes providing the training values to fuel control neural network 246. In such case the training values may be generated by and/or provided from a subject matter expert and/or may be associated with operating one or more reference engines (e.g., engines that correspond to engine 110), operating one or more reference fuel injectors (e.g., fuel injectors that correspond to fuel injector 210) for the reference engines, and/or corresponding performance of the reference engines, and/or the like. In some implementations, fuel control neural network 246 may be trained using an unsupervised training procedure that involves automatically monitoring a plurality of reference engines using reference fuel injectors, determining training values of the set of parameters during operation of the reference engines and/or reference fuel injectors, and measuring performance of the reference engines and/or reference fuel injectors according to the training values (e.g., with respect to actual fuel outputs from fuel injectors of the other engines). Additionally, or alternatively, fuel control neural network 246 may be trained using an artificial neural network processing technique (e.g., using a two-layer feedforward neural network architecture, a three-layer feedforward neural network architecture, and/or the like) to perform pattern recognition with regard to patterns of whether values for a set of parameters provide a target fuel output of the reference fuel injectors that is within a threshold range of a desired fuel output for the reference fuel injectors.

As described herein, the fuel control neural network 246 may determine a target fuel output that causes fuel injectors 210 to provide a quantity of fuel that accurately corresponds to the desired fuel output for the engine. For example, the quantity of fuel may correspond to a volume of fuel per shot (e.g., per injection of fuel) of fuel injector 210, a volume of fuel per rotation of a crankshaft of the engine, and/or the like. Furthermore, fuel control neural network 246 may determine the target fuel output according to one or more of the parameters described herein. As a specific example, fuel control neural network 246 may be configured to determine a target fuel output based on a desired fuel output (e.g., as determined by ECM 140), an instantaneous engine speed of the engine, a pressure at a start of a fuel injection of fuel injector 210, and/or a timing associated with a fuel injection of fuel injector 210 (relative to a position of a piston assembly of the engine when fuel injector 210 injects the fuel). In some instances, fuel control neural network 246 may be configured for a particular shot configuration of fuel injector 210. The shot configuration may correspond to a designed volume of fuel that is injected per shot, a number of shots per rotation of the crankshaft, time between shots, and/or the like. Additionally, or alternatively, fuel control neural network 246 may use the shot configuration of fuel injector 210 as one of the set of parameters used to determine the target fuel output.

Fuel injection control module 248 is configured to communicate with fuel injectors 210 according to a target fuel output provided by fuel control neural network 246. For example, fuel injection control module 248 may serve as an interface between fuel control neural network 246 and fuel injector 210 to convert a target fuel output from fuel control neural network 246 to instructions for fuel injector 210 to inject a quantity of fuel that corresponds to the desired fuel output of the engine. Further, fuel injection control module 248 may be configured to select fuel control neural network 246 from a plurality of neural networks (e.g., a plurality of neural networks configured based on different shot configurations of fuel injector 210) and/or provision fuel control neural network 246 to be used to determine a target fuel output for fuel injector 210. In some implementations, fuel injection control module 248 may provision fuel control neural network 246 to determine a target fuel output for the engine based on one or more parameters and/or one or more user inputs received via operator control device 230. In this way, fuel injector controller 240 may use fuel control neural network 246 and/or fuel injection control module 248 to provide a target fuel output to fuel injectors 210 and/or to control fuel injectors 210 to inject fuel to cause fuel injectors to inject a quantity of fuel that corresponds to the desired fuel output, as described herein.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of fuel control system 200 may perform one or more functions described as being performed by another set of devices of fuel control system 200.

Figure 3:
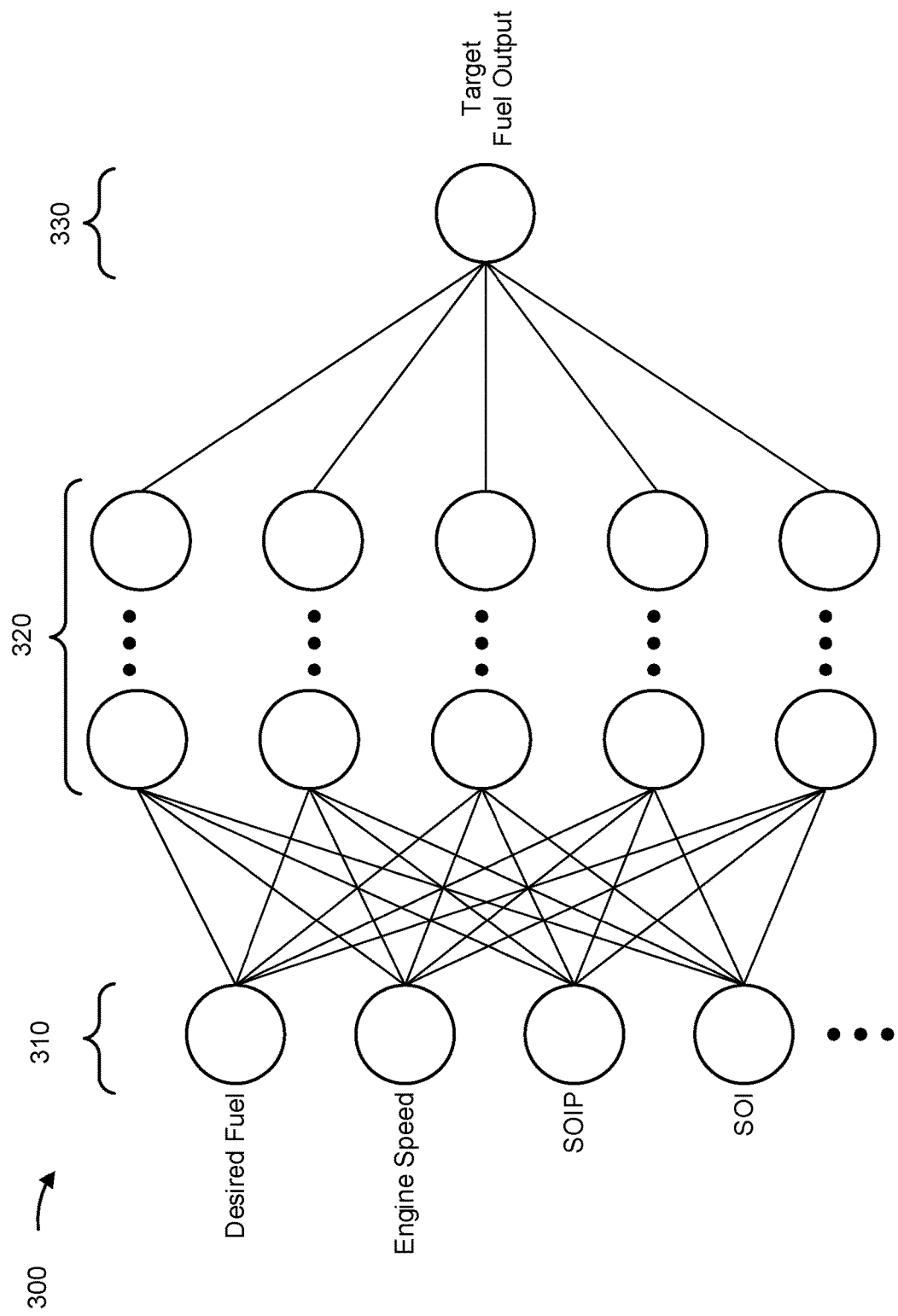
FIG. 3 is a diagram of an example implementation of a neural network that may be used in the fuel control system of FIG. 2.

FIG. 3 is a diagram of an example implementation of a neural network 300 that may be used in the fuel control system of FIG. 2. Neural network 300 of FIG. 3 may correspond to fuel control neural network 246 of FIG. 2. As shown, neural network 300 has an input layer 310, one or more intermediate layers 320 (referred to herein individually as "intermediate layer 320" and collectively as "intermediate layers 320"), and an output layer 330. As described herein, example neural network 300 may receive values for a set of parameters as inputs to input layer 310, use intermediate layers 320 to process the values for the set of parameters and select a target fuel output, and provide the selected fuel output via output layer 330 of neural network 300. For example, the neural network may be configured to select a target fuel output from a plurality of candidate fuel outputs of nodes of the intermediate layers.

In the example of FIG. 3, input layer 310 receives a desired fuel, an engine speed, an SOIP, and an SOI as inputs to neural network 300. The inputs may correspond to a set of measured parameters of an engine (e.g., engine 110) and/or a fuel injector (e.g., fuel injector 210) while the engine is under operation and/or the fuel injector is injecting fuel. Neural network 300 may use the intermediate layers (e.g., hidden layers) to determine the target fuel output based on the set of parameters. For example, the intermediate layers may include one or more feedforward layers and/or one or more recurrent layers to determine the target fuel output for a fuel injector (e.g., fuel injector 126 of FIG. 1 and/or fuel injector 210 of FIG. 2) of the engine. The one or more feedforward layers and/or recurrent layers may include a plurality of coupled nodes that are linked according to being trained as described herein. In this way, links between nodes of intermediate layers 320 may correspond to predictions, classifications, and/or the like that are associated with the parameters that would lead to determining a target fuel output that is within a threshold range (or within a threshold level of accuracy) of a desired fuel output for the fuel injector and/or engine.

As indicated above, FIG. 3 is provided as an example. Other examples may differ from what is described in connection with FIG. 3.

FIG. 4 is a flow chart of an example process 400 associated with fuel injection control using a neural network. In some implementations, one or more process blocks of FIG. 4 may be performed by a fuel injector controller (e.g., fuel injector controller 240). In some implementations, one or more process blocks of FIG. 4 may be performed by another device or a group of devices separate from or including the fuel injector controller, such as an ECM (e.g., ECM 140), a fuel injector (e.g., fuel injector 210), a sensor (e.g., sensor 220), an operator control device (e.g., operator control device 230), and/or the like.

As shown in FIG. 4, process 400 may include determining respective values of a set of parameters of the engine (block 410). For example, the fuel injector controller (e.g., using processor 242, memory 244, fuel control neural network 246, fuel injection control module 248, and/or the like) may determine respective values of a set of parameters of the engine, as described above.

The set of parameters may include a desired fuel output, a measured instantaneous engine speed associated with the engine, a measured pressure at a start of a fuel injection of the fuel injector, a configured timing associated with a fuel injection of the fuel injector, a shot configuration of the fuel injector, and/or the like. The desired fuel output corresponds to a quantity of fuel that is to be injected by the fuel injector.

As further shown in FIG. 4, process 400 may include processing, using a neural network, the respective values to determine a target fuel output of the fuel injector, wherein the neural network is configured to determine the target fuel output based on the set of parameters being an input layer of the neural network (block 420). For example, the fuel injector controller (e.g., using processor 242, memory 244, fuel control neural network 246, fuel injection control module 248, and/or the like) may process, using a neural network, the respective values to determine a target fuel output of the fuel injector, as described above. In some implementations, the neural network is configured to determine the target fuel output based on the set of parameters being an input layer of the neural network.

The respective values may be processed by inputting the respective values into the input layer of the neural network; using one or more feedforward layers or one or more recurrent layers of the neural network to select the target fuel output, and providing the target fuel output via an output layer of the neural network. The neural network may be configured based on training the neural network using training values for the set of parameters, prior to receiving the respective values of the set of parameters.

As further shown in FIG. 4, process 400 may include determining, based on an output of the neural network, the target fuel output (block 430). For example, the fuel injector controller (e.g., using processor 242, memory 244, fuel control neural network 246, fuel injection control module 248, and/or the like) may determine, based on an output of the neural network, the target fuel output, as described above.

As further shown in FIG. 4, process 400 may include providing the determined target fuel output to the fuel injector to permit the fuel injector to inject fuel according to the target fuel output (block 440). For example, the fuel injector controller (e.g., using processor 242, memory 244, fuel control neural network 246, fuel injection control module 248, and/or the like) may provide the determined target fuel output to the fuel injector to permit the fuel injector to inject fuel according to the target fuel output, as described above.

The neural network may be configured to provide the target fuel output to be within a threshold range of a desired fuel output for the fuel injector.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

Actual fuel output from one or more fuel injectors of an engine (a quantity of fuel that is released into one or more corresponding cylinders of the engine) can be a defining parameter for a particular characteristic of an engine (e.g., performance of an engine, emissions of an engine, and/or the like). However, an actual fuel output from one or more fuel injectors may not accurately correspond to a desired fuel output from the fuel injector. For example, over time, due to usage, wear and tear, mechanical failures, and/or the like, characteristics of a fuel injector and/or the engine may change, thus affecting the actual fuel output, while processes and/or parameters used to determine a desired fuel output may relatively be maintained. Accordingly, previous techniques for controlling a target fuel output may not accurately cause a fuel injector to inject a quantity of fuel corresponding to a desired fuel output.

Some implementations described herein provide a fuel injector controller (e.g., fuel injector controller 240) that is capable of receiving values for a set of parameters of an engine (e.g., engine 110), processing the values for the set of parameters via a set of layers of a fuel control neural network (e.g., fuel control neural network 246), determining a target fuel output (e.g., a desired fuel output) for the engine associated with the set of parameters, and/or causing a fuel injector (e.g., fuel injector 210) to inject fuel according to the target fuel output.

In this way, the fuel injector controller can provide a target fuel output, using a neural network, that is within a threshold level of accuracy of a desired fuel output for the engine (e.g., regardless of changes and/or alterations to one or more parameters of the engine, wear and tear of one or more components of the engine, an age and/or usage of the engine, a calibration setting of the engine, and/or the like). In other words, an actual fuel output from the fuel injectors may correspond more closely, relative to previous techniques, to a desired fuel output by providing the target fuel output using a neural network, as described herein. This permits the fuel injector controller to cause a fuel injector to more quickly and accurately inject a quantity of fuel that is required to operate the engine according to the needs of the engine and/or to operate the engine as expected or designed, thereby conserving resources associated with operating the engine. Such resources may include consumable resources (e.g., fuel, lubricant, and/or the like), hardware/material resources of components of the engine, natural resources (e.g., by reducing emissions), and/or the like.

Furthermore, using a neural network, as described herein may allow for more variations of quantities of a set of parameters used to determine a fuel output and/or more variations of values of the set of parameters by enabling dynamic determinations of a target fuel output that would most closely match or correlate to a desired fuel output (e.g., using machine learning and/or artificial intelligence) relative to previous techniques that used static mappings of engine speeds, desired engine speeds, and/or other various parameters. Accordingly, the fuel injector controller may provide a dynamic target fuel output that is more accurate relative to previous techniques that provided a desired fuel output to a fuel injector. In this way, the fuel injector that uses the target fuel output, as described herein, can inject an actual quantity of fuel that correlates more closely to the target fuel output than previously used desired fuel input, thus improving performance of the engine.

As used herein, the articles "a" and "an" are intended to include one or more items and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
    provisioning, by an engine control module and based on a set of parameters, a neural network to provide a target fuel output for a fuel injector of an engine under operation,
        wherein the target fuel output is to be used by the fuel injector to inject a quantity of fuel that is within a threshold range of a desired fuel output for the fuel injector, and
        wherein the set of parameters include one or more of:
            an instantaneous engine speed associated with the engine, or
            a pressure at a start of a fuel injection of the fuel injector;
    determining, by the engine control module, the desired fuel output of the fuel injector;
    receiving, by the engine control module, respective values of the set of parameters,
        wherein the set of parameters are associated with a set of components of the engine and the desired fuel output;
    determining, by the engine control module and based on the respective values and the neural network, the target fuel output; and
    configuring, by the engine control module, the fuel injector to inject a fuel according to the target fuel output.

2. The method of claim 1, wherein the neural network is configured based on training the neural network using training values for the set of parameters prior to receiving the respective values of the set of parameters.

3. The method of claim 2, wherein the training values for the set of parameters are values based on a plurality of different calibrations for optimizing engines under operation.

4. The method of claim 1, wherein the desired fuel output of the fuel injector corresponds to a quantity of fuel that is to be injected by the fuel injector.

5. The method of claim 1, wherein the set of parameters further include:
    the desired fuel output, and
    timing associated with a fuel injection of the fuel injector.

6. The method of claim 1, wherein the neural network is configured based on a shot configuration of the fuel injector.

7. The method of claim 1, wherein the target fuel output corresponds to a volume of fuel that is to be injected per rotation of a crank of a cylinder of the fuel injector.

8. An engine control module, comprising:
one or more memories; and
one or more processors communicatively coupled to the one or more memories, configured to:
configure, based on a set of parameters, a neural network to provide a target fuel output for a fuel injector of an engine;
determine respective values of the set of parameters of the engine while the engine is under operation, wherein the set of parameters include:
a desired fuel output,
an instantaneous engine speed associated with the engine,
a pressure at a start of fuel injection of the fuel injector, and
timing associated with the fuel injection of the fuel injector;
process, using the neural network, the respective values to determine the target fuel output for the fuel injector; and
cause the fuel injector to inject fuel according to the determined target fuel output.

9. The engine control module of claim 8, wherein the respective values are processed using the neural network based on:
inputting the respective values into an input layer of the neural network;
using one or more feedforward layers or one or more recurrent layers of the neural network to select the target fuel output from a plurality of candidate fuel outputs of nodes of the one or more feedforward layers and/or one or more recurrent layers; and
providing the target fuel output via an output layer of the neural network.

10. The engine control module of claim 8, wherein the neural network is configured based on training the neural network using a training values for the set of parameters prior to receiving the respective values of the set of parameters, and
wherein the neural network is configured to provide the target fuel output to be within a threshold range of the desired fuel output for the fuel injector.

11. The engine control module of claim 8, wherein the desired fuel output of the fuel injector corresponds to a quantity of fuel that is to be injected by the fuel injector.

12. The engine control module of claim 8, wherein the pressure associated with the start of fuel injection of the fuel injector is based on a measurement from a pressure sensor that is monitoring the fuel injector.

13. The engine control module of claim 8, wherein the timing associated with fuel injection of the fuel injector corresponds to a position of a crank of a cylinder that is injected with fuel by the fuel injector.

14. The engine control module of claim 8, wherein the set of parameters further includes a shot configuration of the fuel injector.

15. A system comprising:
an engine;
a fuel injector to inject fuel into one or more cylinders of the engine; and
an engine control module configured to, while the engine is under operation:
determine respective values of a set of parameters of the engine;
process, using a neural network, the respective values to determine a target fuel output of the fuel injector, wherein the neural network is configured to determine the target fuel output based on the set of parameters being an input layer of the neural network, and
wherein the set of parameters include one or more of:
an instantaneous engine speed associated with the engine, or
a pressure at a start of a fuel injection of the fuel injector;
determine, based on an output of the neural network, the target fuel output; and
provide the determined target fuel output to the fuel injector to permit the fuel injector to inject fuel according to the target fuel output.

16. The system of claim 15, wherein the respective values are processed using the neural network based on:
inputting the respective values into the input layer of the neural network;
using one or more feedforward layers or one or more recurrent layers of the neural network to select the target fuel output; and
providing the target fuel output via an output layer of the neural network.

17. The system of claim 15, wherein the neural network is configured based on training the neural network using training values for the set of parameters prior to receiving the respective values of the set of parameters.

18. The system of claim 15, wherein the neural network is configured to provide the target fuel output to be within a threshold range of a desired fuel output for the fuel injector.

19. The system of claim 15, wherein the set of parameters further include:
a desired fuel output, and
one or more of:
a configured timing associated with a fuel injection of the fuel injector, or
a shot configuration of the fuel injector.

20. The system of claim 19, wherein the desired fuel output of the fuel injector corresponds to a quantity of fuel that is to be injected by the fuel injector.

* * * * *